(12) United States Patent
Chung

(10) Patent No.: US 11,860,006 B2
(45) Date of Patent: *Jan. 2, 2024

(54) MARKER PRODUCT AND RELATED OPTICAL DETECTION SYSTEM

(71) Applicant: PixArt Imaging Inc., Hsin-Chu (TW)

(72) Inventor: Ching-Lin Chung, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,839

(22) Filed: Oct. 6, 2022

(65) Prior Publication Data

US 2023/0023912 A1 Jan. 26, 2023

Related U.S. Application Data

(63) Continuation of application No. 15/956,730, filed on Apr. 18, 2018, now Pat. No. 11,499,848, which is a continuation-in-part of application No. 15/465,612, filed on Mar. 22, 2017, now Pat. No. 10,760,894, and a continuation-in-part of application No. 15/087,507, filed on Mar. 31, 2016, now Pat. No. 10,061,404.

(30) Foreign Application Priority Data

Aug. 16, 2016 (TW) .................................. 105126056

(51) Int. Cl.
*G01D 5/30* (2006.01)
*G01P 13/02* (2006.01)
*G01D 5/347* (2006.01)

(52) U.S. Cl.
CPC ........... *G01D 5/30* (2013.01); *G01D 5/34707* (2013.01); *G01P 13/02* (2013.01)

(58) Field of Classification Search
CPC ....... G01D 5/30; G01D 5/34707; G01P 13/02
See application file for complete search history.

(56) References Cited

U.S. PATENT DOCUMENTS 11,499,848 B2 * 11/2022 Chung ............... G01D 5/34707

* cited by examiner

*Primary Examiner* — Seung C Sohn
(74) *Attorney, Agent, or Firm* — Winston Hsu

(57) ABSTRACT

An optical detection system includes a marker product and an optical encoding device. The marker product includes a substrate and at least one structural portion. The structural portion has a first surface, a second surface and a dividing axis. The first surface and the second surface are arranged on opposite sides of the dividing axis. A sidelong direction aligning the first surface with the second surface is parallel to a moving direction between the optical encoding device and the marker product. The optical encoding device is disposed adjacent by the marker product. The optical encoding device includes an optical projector and an optical encoder. The optical projector is configured to project the optical detecting signal onto the marker product. The optical encoder is configured to receive an optical reflecting signal from the marker product and encode intensity variation of the optical reflecting signal into digital data.

19 Claims, 11 Drawing Sheets

MARKER PRODUCT AND RELATED OPTICAL DETECTION SYSTEM

CROSS REFERENCE TO RELATED APPLICATIONS

This application is a continuation application of U.S. application Ser. No. 15/956,730, filed on Apr. 18, 2018, which is a continuation-in-part of U.S. application Ser. No. 15/465,612, filed on Mar. 22, 2017, and is a continuation-in-part of U.S. application Ser. No. 15/087,507, filed on Mar. 31, 2016. The contents of these applications are incorporated herein by reference.

BACKGROUND OF THE INVENTION

1. Field of the Invention

The present invention relates to a marker product and an optical detection system, and more particularly, to a marker product and a related optical detection system capable of determining existence and a moving direction of the marker product.

2. Description of the Prior Art

An optical encoder can acquire motion of a movable member by detecting a marker formed on the movable member. The marker has reflectivity different from ones of the movable member. For example, the conventional marker can be dark color coating painted on a light color substrate, or the conventional marker can be made by specific material having the reflectivity different from ones of the substrate, or the conventional marker can be a region of the substrate processed by matting procedure. While the optical encoder and the movable member with the conventional marker are moved relatively, intensity variation of an optical reflection signal is detected to decide existence of the conventional marker and determine motion of the movable member, but the optical encoder cannot acquire a moving direction of the movable member by analysis of the intensity variation. Thus, design of the movable member with a new-typed marker capable of determining the moving direction is an important issue in the related industry.

SUMMARY OF THE INVENTION

The present invention provides a marker product and a related optical detection system capable of determining existence and a moving direction of the marker product for solving above drawbacks.

According to the claimed invention, a marker product is applied to an optical encoding device and includes a substrate and at least one structural portion. The structural portion is formed on the substrate. The structural portion has a first surface, a second surface and a dividing axis. The first surface and the second surface are connected with each other or separated from each other, the first surface and the second surface being arranged on opposite sides of the dividing axis. A sidelong direction aligning the first surface with the second surface is parallel to a moving direction between the optical encoding device and the marker product. Any of the first surface and the second surface are configured to reflect an optical detecting signal projected from the optical encoding device to an orientation away from the dividing axis.

According to the claimed invention, the first surface has a curvature or an inclined angle relative to the substrate the same as or different from a curvature or a foresaid inclined angle of the second surface. The structural portion is a semicircular form or a triangular form. The marker product further includes a plurality of structural portions formed on the substrate side by side, and the first surface of one of the structural portions faces the second surface of an adjacent structural portion. The marker product further includes a plurality of structural portions separated into at least two groups. Each group contains the structural portions arranged side by side, and the said groups are respectively disposed on different paths on the substrate.

According to the claimed invention, an optical detection system includes a marker product and an optical encoding device. The marker product includes a substrate and at least one structural portion. The structural portion is formed on the substrate. The structural portion has a first surface, a second surface and a dividing axis. The first surface and the second surface are connected with each other or separated from each other. The first surface and the second surface are arranged on opposite sides of the dividing axis. A sidelong direction aligning the first surface with the second surface is parallel to a moving direction between the optical encoding device and the marker product. Any of the first surface and the second surface are configured to reflect an optical detecting signal projected from the optical encoding device to an orientation away from the dividing axis. The optical encoding device is disposed adjacent by the marker product and capable of being moved relative to the marker product. The optical encoding device includes an optical projector and an optical encoder. The optical projector is configured to project the optical detecting signal onto the marker product. The optical encoder is electrically connected with the optical projector and configured to receive an optical reflecting signal from the marker product and encode intensity variation of the optical reflecting signal into digital data.

The marker product of the present invention disposes the three-dimensional structural portion on the substrate. The three-dimensional structural portion can generate the waveform of the optical reflecting signal S2 different from the two-dimensional coating, and can be used to determine the moving direction between the marker product and the optical encoding device. An arranging direction aligning the optical projector with the optical encoder of the optical encoding device is preferably the same as the moving direction between the marker product and the optical encoding device, and a central optical axis of the optical projector and a central optical axis of the optical encoder are preferably parallel to a planar normal vector of the substrate, so the optical reflecting signal received by the optical encoding device can accurately indicate codes connoting specific content, and the optical detection system can utilize the codes to execute related application program.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
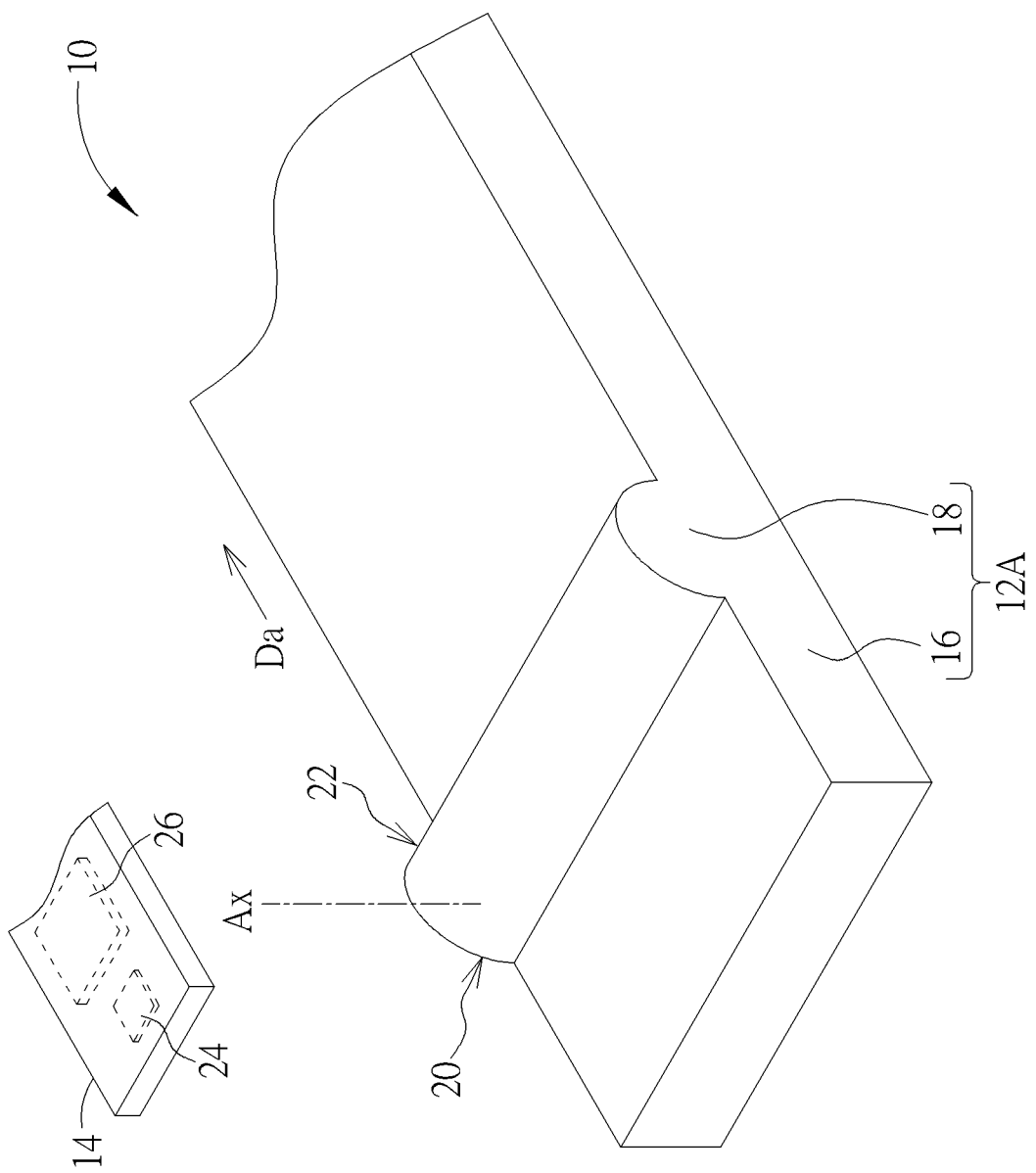
FIG. 1 is a diagram of an optical detection system according to an embodiment of the present invention.
Figure 2:
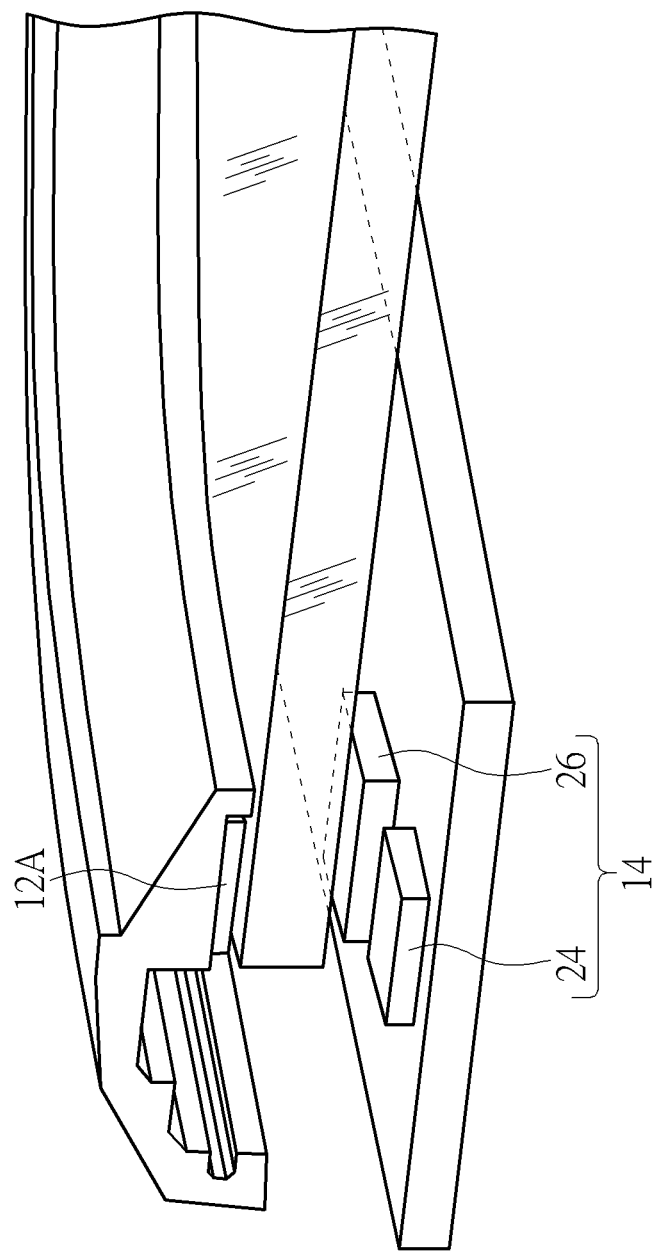
FIG. 2 is a diagram of the optical detection system applied to an electronic apparatus according to the embodiment of the present invention.
Figure 3:
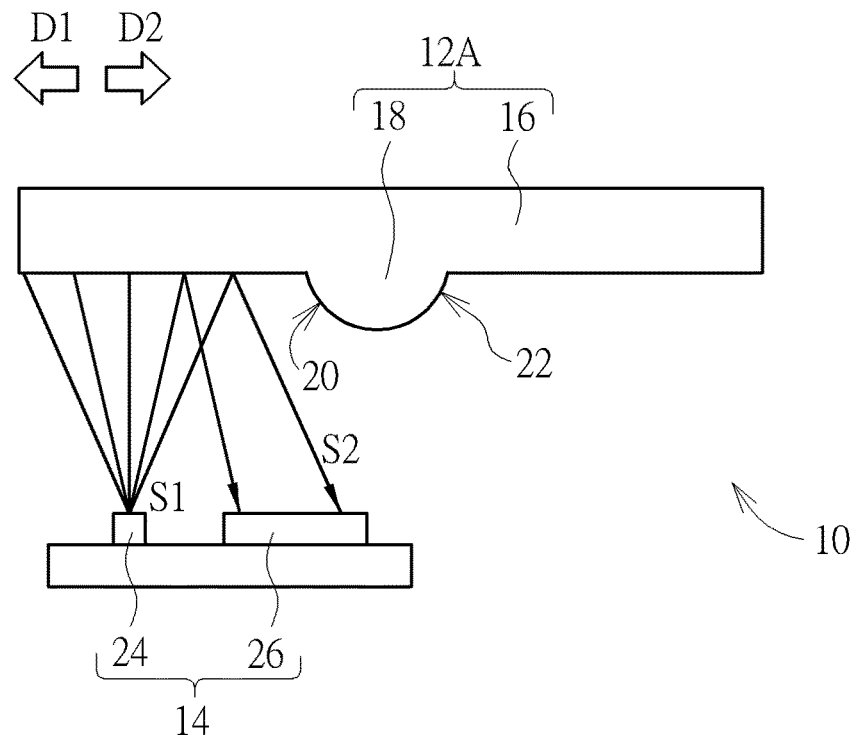
FIG. 3 to FIG. 5 are lateral views of the optical detection system in different operational modes according to the embodiment of the present invention.
Figure 4:
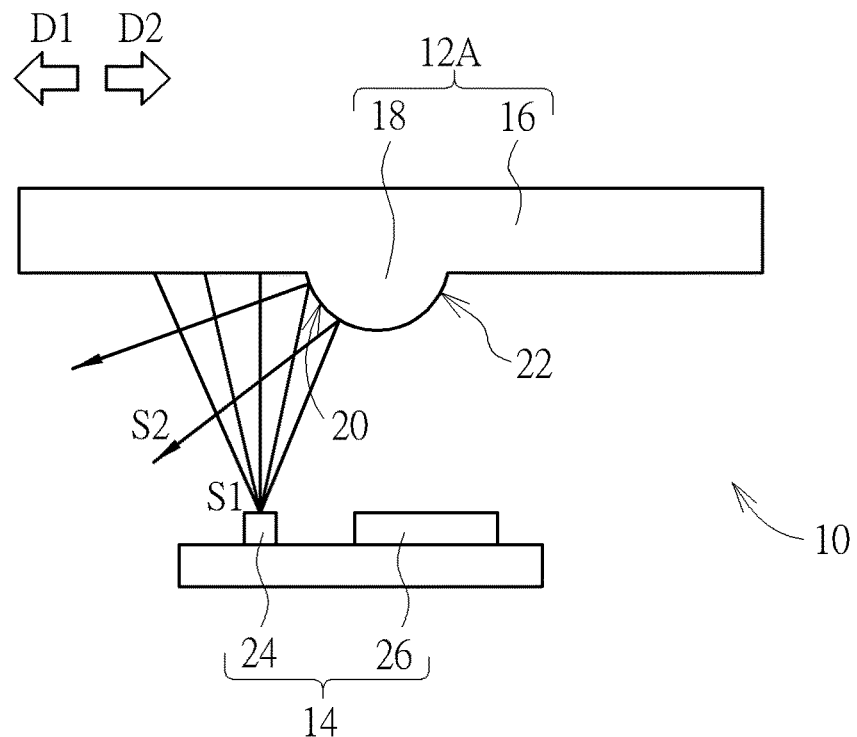
Figure 5:
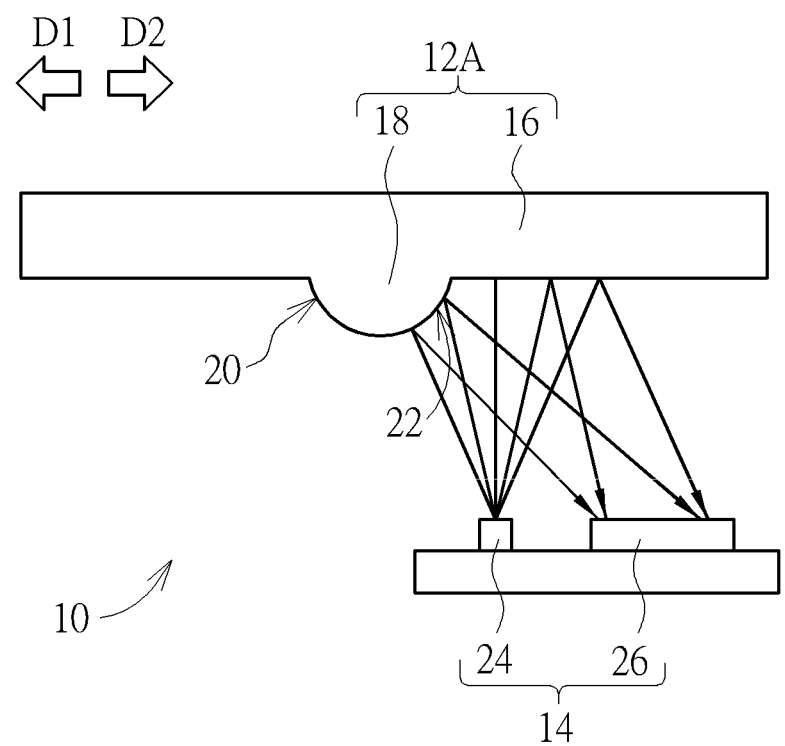
Figure 6:
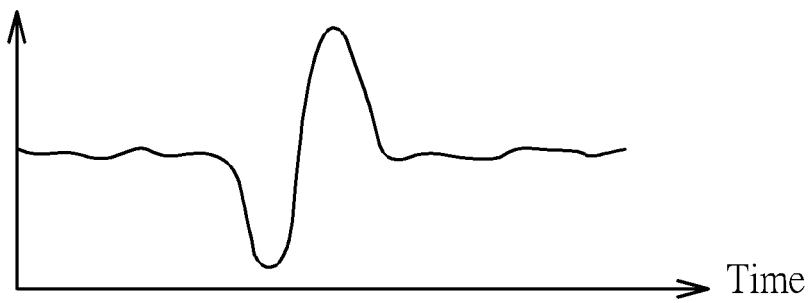
FIG. 6 and FIG. 7 are diagrams of waveform variation detected by the optical detection system in different moving directions according to the embodiment of the present invention.
Figure 7:
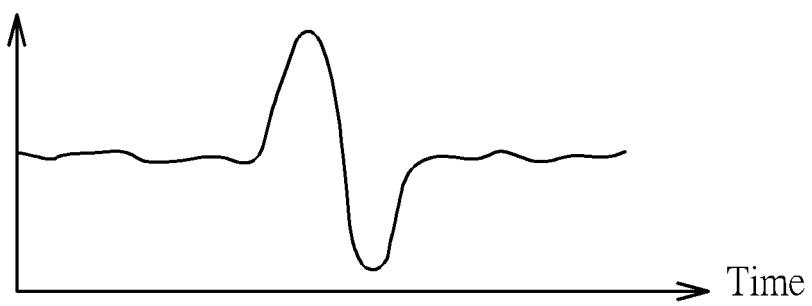

Please refer to FIG. 1 to FIG. 7. FIG. 1 is a diagram of an optical detection system 10 according to an embodiment of the present invention. FIG. 2 is a diagram of the optical detection system 10 applied to an electronic apparatus according to the embodiment of the present invention. FIG. 3 to FIG. 5 are lateral views of the optical detection system 10 in different operational modes according to the embodiment of the present invention. FIG. 6 and FIG. 7 are diagrams of waveform variation detected by the optical detection system 10 in different moving directions according to the embodiment of the present invention. The electronic apparatus can be, but not limited to, a smart wrist watch. A dial plate of the wrist watch is rotatable for specific functions, and the optical detection system 10 can be used to detect a rotary degree and a rotational direction of the dial plate.

The optical detection system 10 includes at least one marker product 12A and an optical encoding device 14. The optical encoding device 14 is disposed adjacent by the marker product 12A and capable of being moved relative to the marker product 12A. The optical encoding device 14 can be used to determine existence and the moving direction of the marker product 12A. The marker product 12 A can include a substrate 16 and a structural portion 18, and the structural portion 18 is formed on an upper surface of the substrate 16. The structural portion 18 can have a first surface 20, a second surface 22 and a dividing axis Ax. The first surface 20 and the second surface 22 are arranged on opposite sides of the dividing axis Ax. The first surface 20 and the second surface 22 can be connected with each other, which means the dividing axis Ax is a border between the first surface 20 and the second surface 22; further, the first surface 20 and the second surface 22 can be separated from each other, which means bridging matter (not shown in the figure) is located between the first surface 20 and the second surface 22, and the bridging matter can be hollow or a physical object (such as an arc surface or a flat surface).

The optical encoding device 14 can include an optical projector 24 and an optical encoder 26 electrically connected with each other. The optical projector 24 is configured to project an optical detecting signal S1 onto the marker product 12A. The optical encoder 26 is configured to receive an optical reflecting signal S2 reflected from the marker product 12A and encode intensity variation of the optical reflecting signal S2 into digital data. The digital data can contain information about the moving direction of the structural portion 18 and structural parameters of the marker product 12A. It should be mentioned that a sidelong direction Da aligning the first surface 20 with the second surface 22 preferably can be parallel to (but not limited to) the moving direction D1 and D2 between the optical encoding device 14 and the marker product 12A, so that the optical encoding device 14 can receive the optical reflecting signal S2 with identical parameter variation no matter what moving direction the marker product 12A is moved.

For example, the marker product 12A is moved along the moving direction D1 from right to left. As shown in FIG. 3, the optical reflecting signal S2 received by the optical encoder 26 is stable while the optical detecting signal S1 is projected onto the upper surface of the substrate 16. Then, as shown in FIG. 4, the optical detecting signal S1 can be reflected to an orientation away from the dividing axis Ax while the optical detecting signal S1 is projected onto the first surface 20, and the optical encoder 26 receives the optical reflecting signal S2 with low intensity. Later, as shown in FIG. 5, the optical detecting signal S1 can be further reflected to another orientation away from the dividing axis Ax while the optical detecting signal S1 is projected onto the second surface 22, and the optical encoder 26 can receive the optical reflecting signal S2 with high intensity. That is, the first surface 20 and the second surface 22 are used to reflect the optical detecting signal S1 to opposite orientation away from the dividing axis Ax, and the waveform variation of the optical reflecting signal S2 is decreased for a start and then increased, as shown in FIG. 6. The optical encoding device 14 determines the marker product 12A is moved along the moving direction D1 in accordance with the waveform variation of the optical reflecting signal S2.

While the marker product 12A is moved along the moving direction D2 from left to right, such as an example of the marker product 12A moved from position shown in FIG. 5 to position shown in FIG. 3, the optical detecting signal S1 can be projected onto the right-side upper surface of the substrate 16, the second surface 22, the first surface 20, and left-side upper surface of the substrate 16 in sequence. The waveform variation of the optical reflecting signal S2 received by the optical encoder 26 can be increased for a start and then suddenly decreased and recovered later to an initial normal intensity, as shown in FIG. 7. In the present invention, the optical detection system 10 can utilize asymmetry of the optical projector 24 and the optical encoder 26 and reflection of the optical reflecting signal S2 with respect to certain specific orientation to determine the moving direction of the marker product 12A (or the moving direction of the optical encoding device 14 relative to the marker product 12A).

Figure 8:
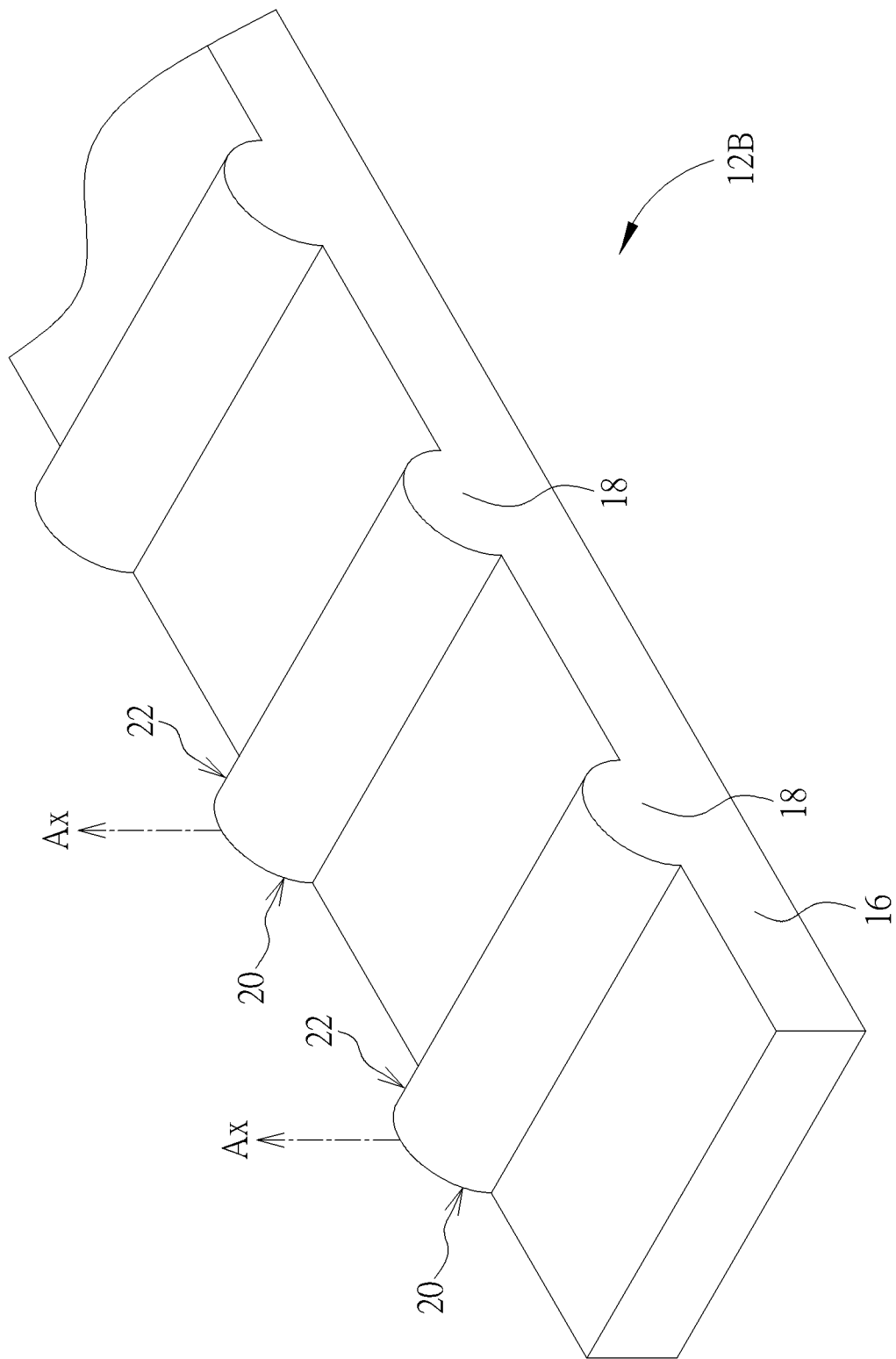
FIG. 8 to FIG. 12 respectively are diagrams of the marker product according to different embodiments of the present invention.
Figure 11:
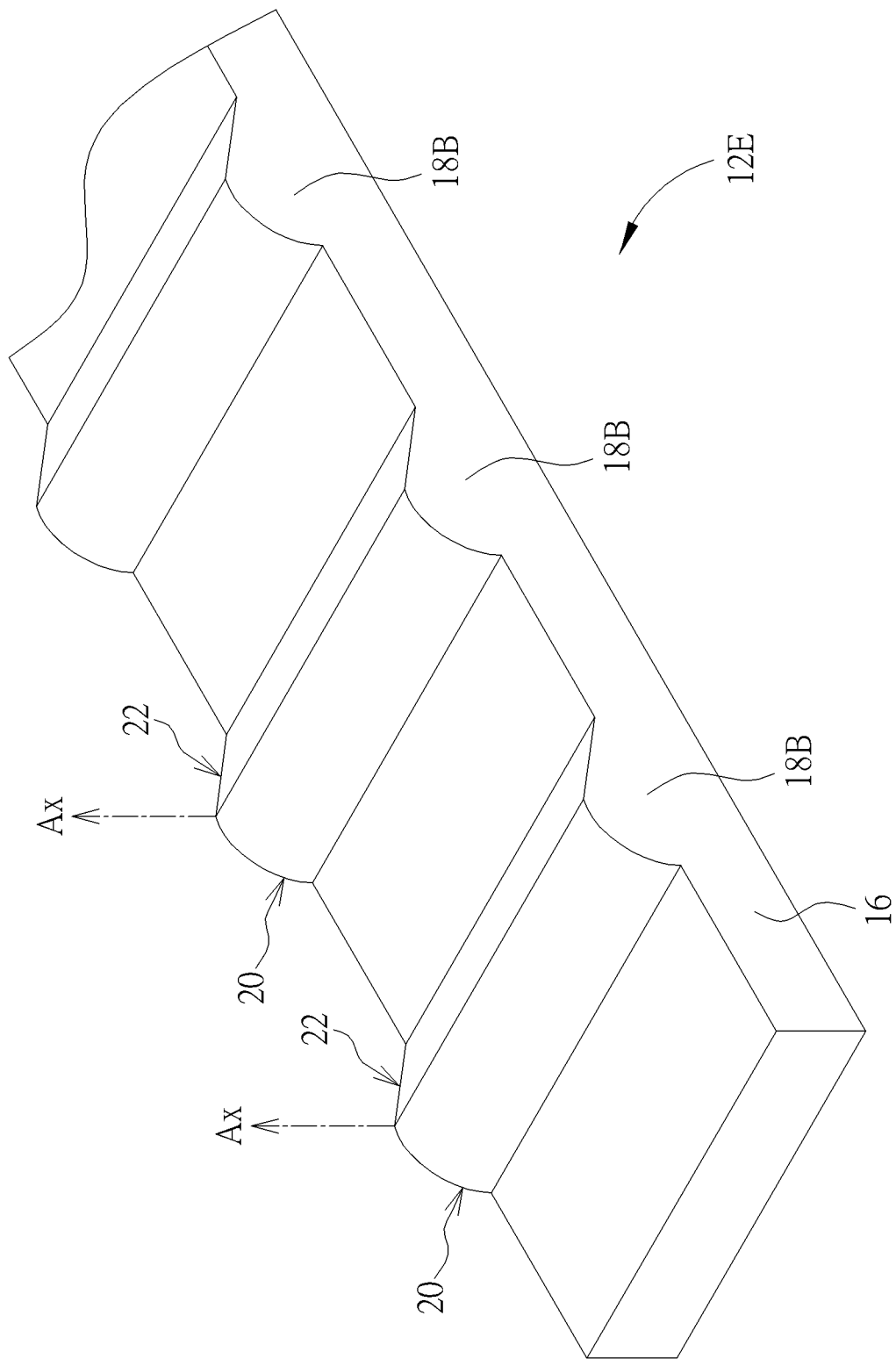
Figure 12:
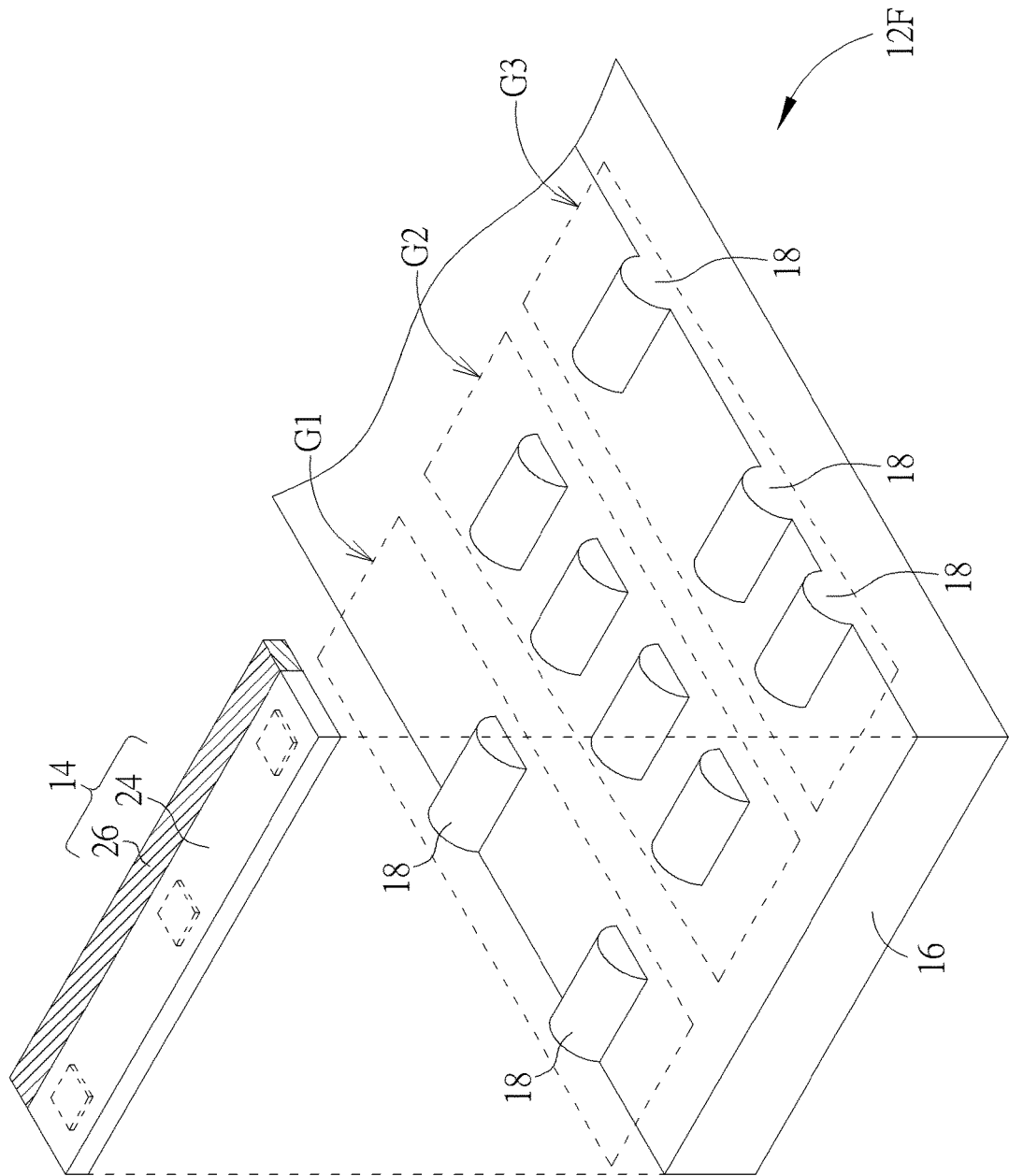
Figure 13:
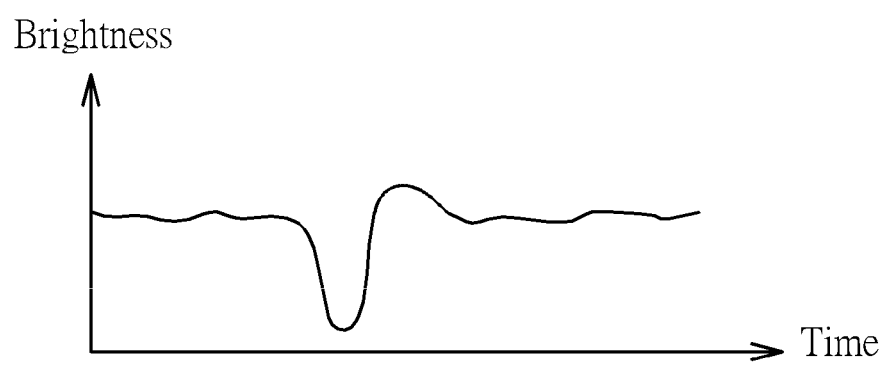
FIG. 13 is a diagram of the waveform variation resulted by the marker product shown in FIG. 11.

Please refer to FIG. 8 to FIG. 13. FIG. 8 to FIG. 12 respectively are diagrams of the marker product according to different embodiments of the present invention. FIG. 13 is a diagram of the waveform variation resulted by the marker product shown in FIG. 11. In the following embodiments, elements having the same numerals as one of the foresaid embodiment have the same structures and functions, and a detailed description is omitted herein for simplicity. As shown in FIG. 8, the marker product 12B can include a plurality of structural portions 18 formed on the substrate 16 side by side, which means the first surface 20 of one of the structural portions 18 faces the second surface 22 of an adjacent structural portion 18; the structural portions 18 are not arranged along its lengthwise direction, so the optical encoding device 14 can sequentially scan the structural portions 18 while the marker product 12B and the optical encoding device 14 are moved relatively. Further, the structural portion 18 can be a convex semicircular form, and each first surface 20 has a curvature the same as or different from a curvature of the corresponding second surface 22.

Figure 9:
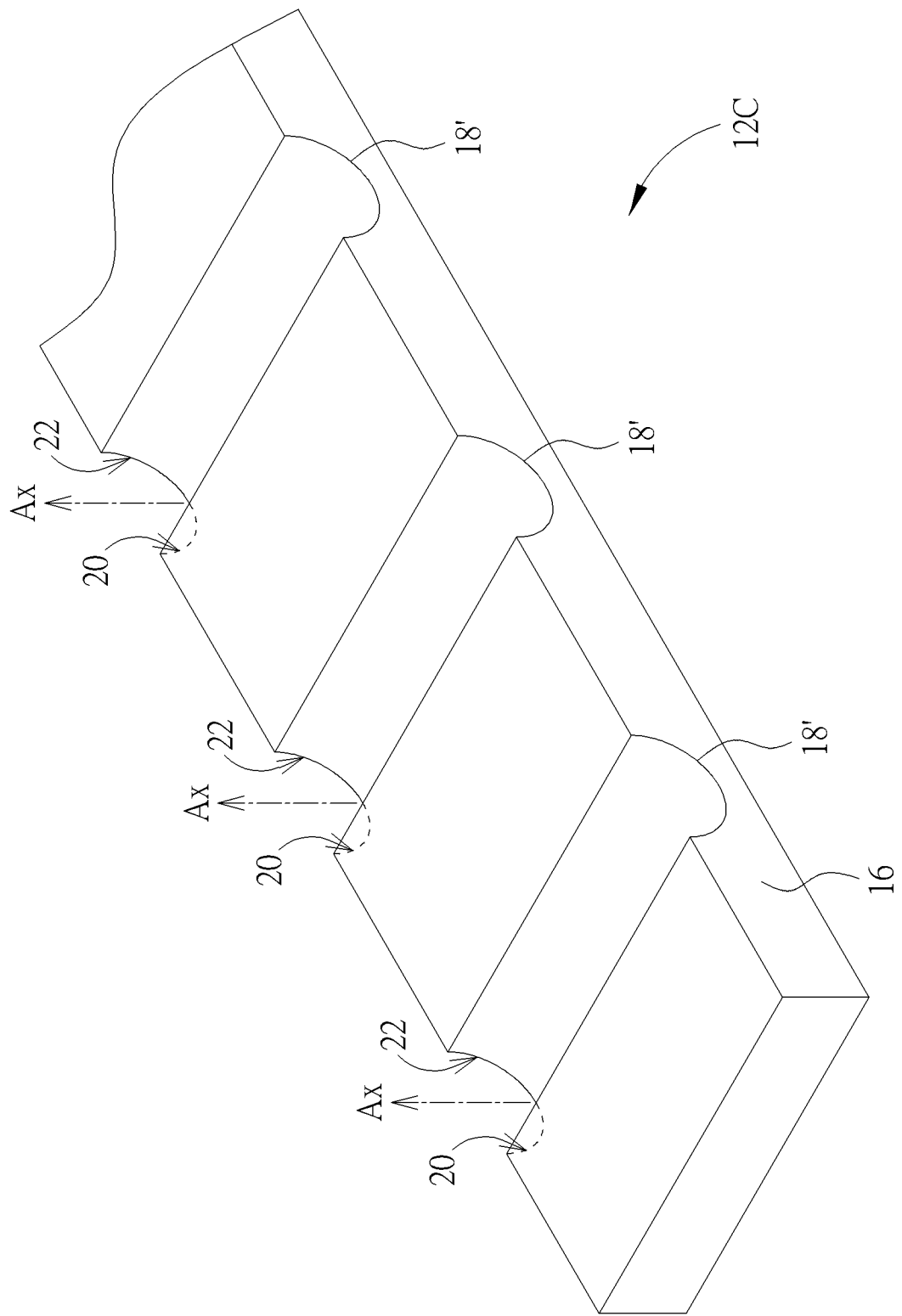
Figure 10:
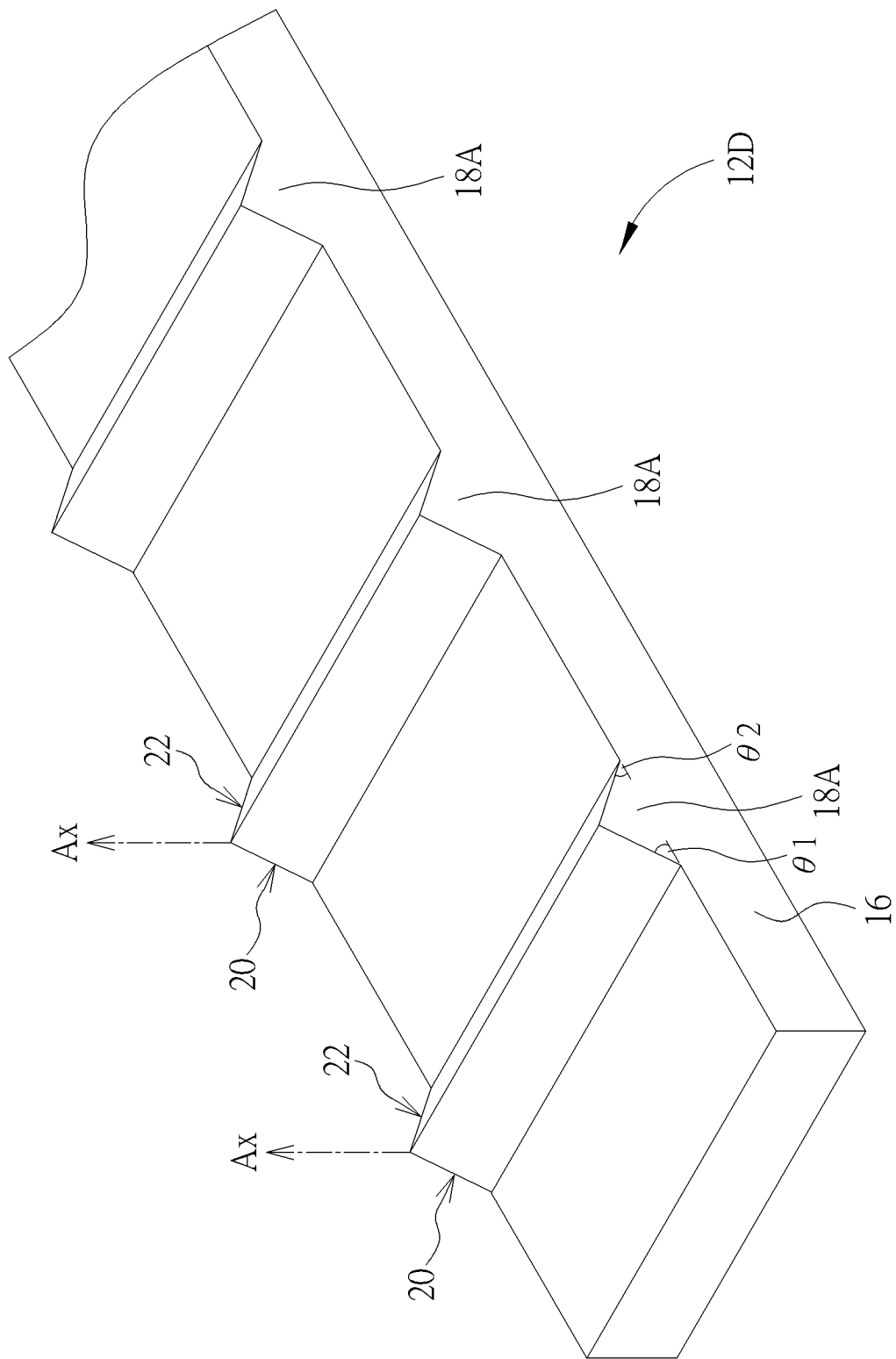

As shown in FIG. 9, each structural portion 18' of the marker product 12C can be a concave semicircular form, and the curvature of the first surface 20 can be the same as or different from the curvature of the corresponding second surface 22. As shown in FIG. 10, the marker product 12D can have one or more structural portion 18A, and the structural portion 18A can be a convex triangular form or a concave triangular form (not shown in the figures); in addition, an inclined angle θ1 of the first surface 20 relative to the substrate 16 can be the same as or different from the inclined angle θ2 of the second surface 22. As shown in FIG. 11, the structural portion 18B of the marker product 12E is an asymmetric form; the first surface 20 and the second surface 22 of the structural portion 18B respectively can be the arc surface and the flat surface, or the arc surfaces with different curvatures, or the flat surfaces with different inclined angles. As shown in FIG. 12, the marker product 12F can include the plurality of structural portions 18 separated into several groups G1, G2 and G3; each group contains the structural portions 18 arranged side by side, and the groups G1, G2 and G3 are respectively disposed on different paths on the substrate 16. The said path can be interpreted as a trail toward the sidelong direction Da of the structural portion 18.

As shown in FIG. 11 and FIG. 13, the first surface 20 and the second surface 22 of the structural portion 18B can generate diverse reflection effect. The asymmetric structural portion 18B can be mixed with the symmetric structural portions, and the optical encoding device 14 can define the asymmetric structural portion 18B as locating reference; or the symmetric structural portion is mixed with the asymmetric structural portions 18B, and the symmetric structural portion is used as the locating reference. The optical encoding device 14 can receive the waveform generated by the asymmetric structural portion 18B and decide a beginning or an end (which depends on location of the asymmetric structural portion 18B) of scanning the plurality of symmetric structural portions or any reminder.

In addition, a coating (not shown in the figures) may be disposed on the substrate 16 and locate at a front or a rear of the asymmetric structural portions or the symmetric structural portions. Reflectivity of the coating is different from reflectivity of the substrate 16. The waveform variation of the optical reflecting signal S2 resulted by the two-dimensional coating is a positive pulse or a negative pulse, which is different from the dual directional waveform variation of the marker product in the present invention, as shown in FIG. 13. Thu, the optical encoding device 14 can receive the waveform resulted by the two-dimensional coating to decide the beginning or the end of scanning the plurality of asymmetric structural portions and the symmetric structural portions.

The optical projector 24 can include a spot light source. While the optical encoding device 14 and the marker product (such as the marker product 12B, 12C, 12D, 12E and 12F) with the structural portions 18 are moved relatively, the spot light source can scan any of the structural portions 18 to determine the moving direction, and further sequentially scans the structural portions 18 to acquire a distance between the adjacent structural portions 18. Besides, a width, a depth and a curvature of the structural portion 18 may affect the waveform variation of the optical reflecting signal S2. The distance, the width, the depth and/or the curvature can be adjusted and analyzed to generate the specific waveform variation for acquiring the corresponding digital data.

For a possible embodiment shown in FIG. 12, the optical projector 24 may include several spot light sources, and an amount of the spot light sources is equal to an amount of the groups; each spot light source is used to illuminate the corresponding group while the marker product 12F and the optical encoding device 14 are moved relatively. The optical encoding device 14 can have one optical encoder 26 to receive the optical reflecting signal S2 resulted by the groups G1, G2 and G3, or may use several optical encoders 26 to individually receive the optical reflecting signal S2 resulted by the corresponding groups G1, G2 and G3. For another possible embodiment shown in FIG. 12, the optical projector 24 may include a line light source, and the line light source can simultaneously illuminate the groups G1, G2 and G3 while the marker product 12F and the optical encoding device 14 are moved relatively.

The optical encoder 26 of the optical encoding device 14 matched with the marker product 12F not only can analyze the distance between the adjacent structural portions 18 and the width, the depth and/or the curvature of each structural portion 18, but also can analyze a gap of the structural portions 18 between the groups G1 and G2 or between the groups G2 and G3. In this embodiment, the marker product 12F has several groups G1, G2 and G3. Each group G1, G2 or G3 may have particular arrangement of the structural portions 18 to represent the specific digital data, and the gap between the adjacent groups G1/G2 and G2/G3 may represent another specific digital data. The optical encoding device 14 can receive the waveform variation about the groups G1, G2 and G3 and then encode those intensity variations to acquire related codes.

In conclusion, the marker product of the present invention disposes the three dimensional structural portion on the substrate. The three dimensional structural portion can generate the waveform of the optical reflecting signal S2 different from the two dimensional coating, and can be used to determine the moving direction between the marker product and the optical encoding device. An arranging direction aligning the optical projector with the optical encoder of the optical encoding device is preferably the same as the moving direction between the marker product and the optical encoding device, and a central optical axis of the optical projector and a central optical axis of the optical encoder are preferably parallel to a planar normal vector of the substrate, so the optical reflecting signal received by the optical encoding device can accurately indicate codes connoting specific content, and the optical detection system can utilize the codes to execute related application program.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A marker product applied to an optical encoding device, the marker product comprising:
a substrate; and
at least one structural portion formed on the substrate, the structural portion having a first surface, a second surface and a dividing axis, the first surface and the second surface being connected with each other as a stepless camber, the first surface and the second surface being arranged on opposite sides of the dividing axis, wherein any of the first surface and the second surface are configured to reflect an optical detecting signal projected from the optical encoding device to an orientation away from the dividing axis for generating an optical reflecting signal, and order of decline and rise in intensity variation of the optical reflecting signal is analyzed to acquire the shifting direction;

wherein one variation changed from the decline to the rise and another intensity variation changed from the rise to the decline respectively represent different shifting directions of the structural portion.

2. The marker product of claim 1, wherein the first surface has a curvature or an inclined angle relative to the substrate the same as a curvature or a foresaid inclined angle of the second surface.

3. The marker product of claim 1, wherein the first surface has a curvature or an inclined angle relative to the substrate different from a curvature or a foresaid inclined angle of the second surface.

4. The marker product of claim 1, wherein the structural portion is a semicircular form or a triangular form.

5. The marker product of claim 1, wherein the marker product further comprises a plurality of structural portions formed on the substrate side by side, the first surface of one of the structural portions faces the second surface of an adjacent structural portion.

6. The marker product of claim 1, wherein the marker product further comprises a plurality of structural portions separated into at least two groups, each group contains the structural portions arranged side by side, and the said groups are respectively disposed on different paths on the substrate.

7. An optical detection system, comprising:
a marker product, comprising:
a substrate; and
at least one structural portion formed on the substrate, the structural portion having a first surface, a second surface and a dividing axis, the first surface and the second surface being connected with each other as a stepless camber, the first surface and the second surface being arranged on opposite sides of the dividing axis, wherein any of the first surface and the second surface are configured to reflect an optical detecting signal to an orientation away from the dividing axis; and
an optical encoding device disposed adjacent by the marker product and capable of being moved relative to the marker product, the optical encoding device comprising:
an optical projector configured to project the optical detecting signal onto the marker product; and
an optical encoder electrically connected with the optical projector and configured to receive an optical reflecting signal from the marker product and encode intensity variation of the optical reflecting signal into digital data, wherein order of decline and rise in intensity variation of the optical reflecting signal is analyzed to acquire the shifting direction;
wherein one variation changed from the decline to the rise and another intensity variation changed from the rise to the decline respectively represent different shifting directions of the structural portion.

8. The optical detection system of claim 7, wherein the first surface has a curvature or an inclined angle relative to the substrate the same as a curvature or a foresaid inclined angle of the second surface.

9. The optical detection system of claim 7, wherein the first surface has a curvature or an inclined angle relative to the substrate different from a curvature or a foresaid inclined angle of the second surface.

10. The optical detection system of claim 7, wherein the structural portion is a semicircular form or a triangular form.

11. The optical detection system of claim 7, wherein the marker product further comprises a plurality of structural portions formed on the substrate side by side, the first surface of one of the structural portions faces the second surface of an adjacent structural portion.

12. The optical detection system of claim 11, wherein the optical projector comprises a spot light source, the spot light source sequentially scans the plurality of structural portions while the optical encoding device is moved relative to the marker product.

13. The optical detection system of claim 11, wherein the optical encoder analyzes a distance between two adjacent structural portions to acquire the digital data.

14. The optical detection system of claim 7, wherein the marker product further comprises a plurality of structural portions separated into at least two groups, each group contains the structural portions arranged side by side, and the said groups are respectively disposed on different paths on the substrate.

15. The optical detection system of claim 14, wherein the optical projector comprises at least two spot light sources, each spot light source scans a corresponding group of the two groups while the optical encoding device is moved relative to the marker product.

16. The optical detection system of claim 14, wherein the optical projector comprises a line light source, the line light source simultaneously scans the two groups while the optical encoding device is moved relative to the marker product.

17. The optical detection system of claim 16, wherein the optical encoder analyzes a gap between a structural portion of one of the groups and a corresponding structural portion of the other group.

18. The optical detection system of claim 7, wherein an arranging direction aligning the optical projector with the optical encoder is the same as the shifting direction between the optical encoding device and the marker product.

19. The optical detection system of claim 7, wherein an optical axis of the optical projector and an optical axis of the optical encoder are parallel to a planar normal vector of the substrate.

* * * * *